April 22, 1924.
L. ALTER
TAXIMETER CONTROL
Filed Sept. 22, 1923   2 Sheets-Sheet 2
1,491,329
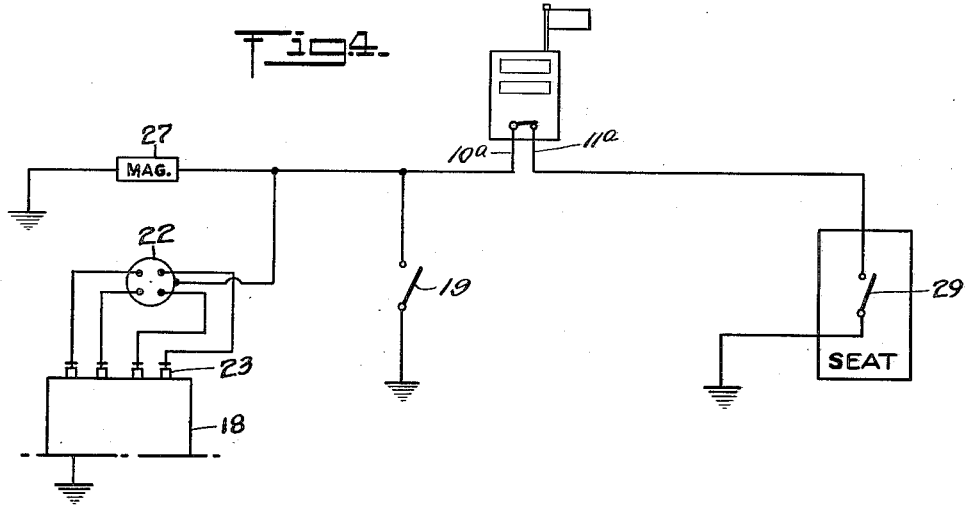
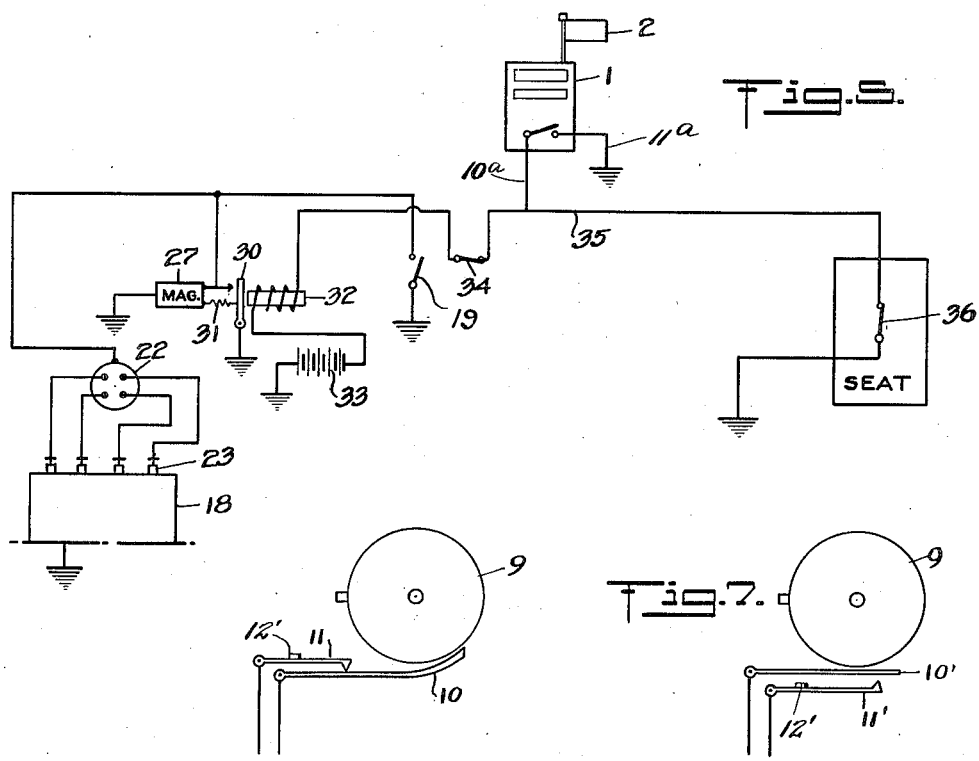
INVENTOR
Louis Alter
BY
*Mason Fenwick Lawrence*,
ATTORNEYS Patented Apr. 22, 1924.

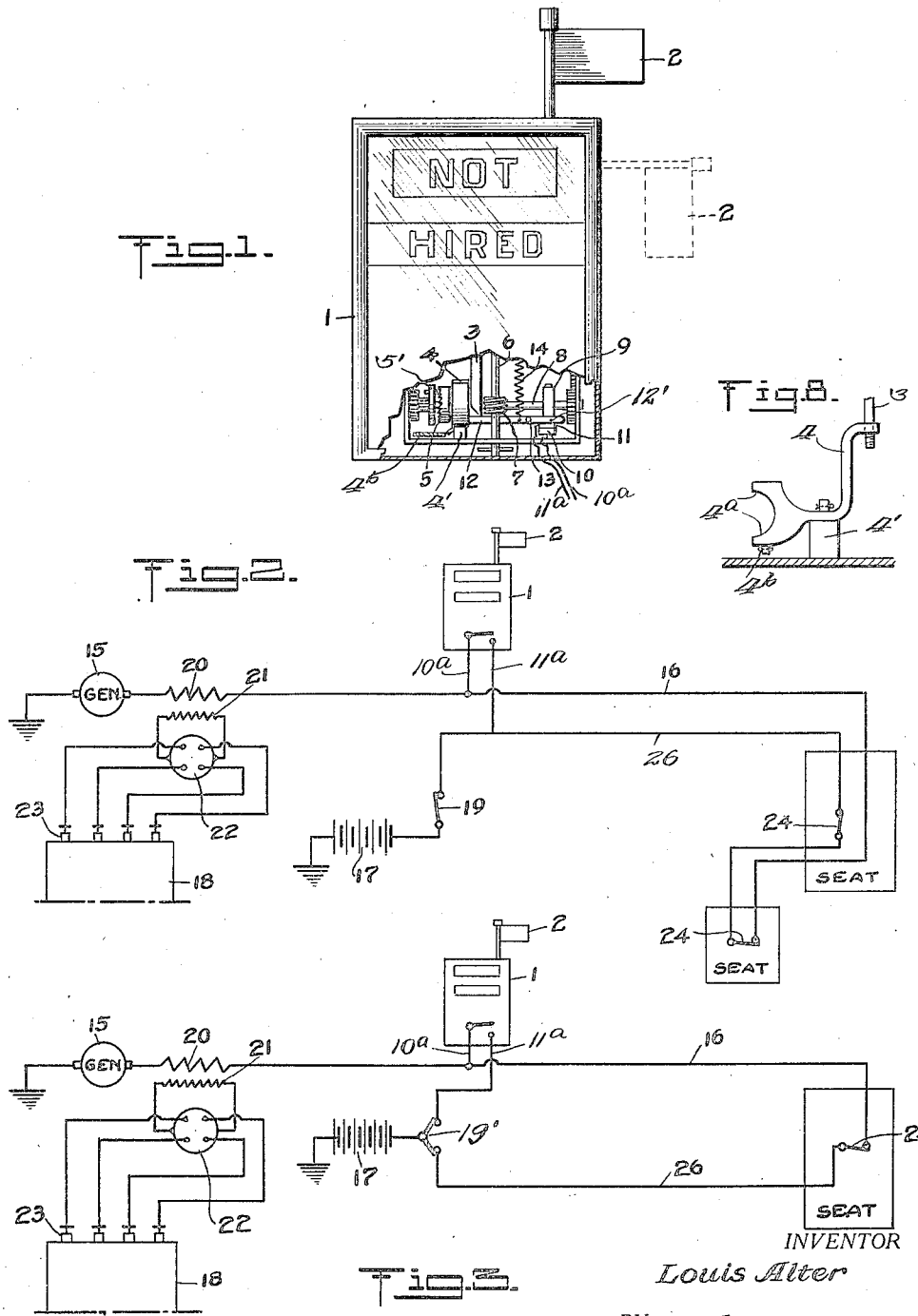

1,491,329

UNITED STATES PATENT OFFICE.

LOUIS ALTER, OF NEW YORK, N. Y., ASSIGNOR OF ONE-HALF TO ALBERT SAKIN, OF NEW YORK, N. Y.

TAXIMETER CONTROL.

Application filed September 22, 1923. Serial No. 664,332.

*To all whom it may concern:*

Be it known that I, LOUIS ALTER, a citizen of the United States, residing at New York, in the county of Bronx and State of New York, have invented certain new and useful Improvements in Taximeter Controls; and I do hereby declare the following to be a full, clear, and exact description of the invention, such as will enable others skilled in the art to which it appertains to make and use the same.

This invention relates to taximeter controls and has for its objects to provide a control mechanism designed to be operated by a passenger riding in a taxi cab when the operator fails to make the meter record; to provide a device which will stop the motor of the vehicle when the meter is not recording and the vehicle is travelling with a passenger but will not interrupt operation of the engine while the vehicle is standing still: to permit the vehicle to begin to move without stopping the engine although a passenger is seated and the meter is not recording; to adapt the device to various constructions of meters and electric systems of engines; to secure simplicity of construction and operation, and to obtain other advantages and results as may be brought out in the following description:

Referring to the accompanying drawings in which like numerals of reference indicate similar parts throughout the several views:—

Figure 1 is an elevation of a meter partially broken away showing parts of the present invention therein.

Figure 2 is a diagrammatic view of one method of wiring employed in connection with the invention in a vehicle employing a generator and battery.

Figure 3 is a view similar to Figure 2 showing a different type of dashboard switch and a single passenger seat.

Figures 4 and 5 are diagrammatic views of different methods of wiring in connection with the invention in a vehicle employing a magneto;

Figure 6 is a diagrammatic view showing a switch by which the circuit of the meter may be intermittently broken;

Figure 7 is a diagrammatic view of a switch by which the circuit may be intermittently closed;

Figure 8 is a side elevation of the clutch lever and portion of the flag controlled bar.

In the specific embodiment of the invention illustrated in said drawings, reference numeral 1 indicates the ordinary taximeter which is employed in connection with taxicabs. Within the meter is a vertical shaft 6 adapted to be continuously driven when the motor vehicle is moving. This shaft is geared to a horizontally disposed shaft 8 by suitable gearing generally indicated at 7. Shaft 8 is geared to the recording mechanism of the meter. Slidably mounted on shaft 8 is a clutch member 5 which is adapted to be coupled with a clutch member 5' fixed on shaft 8. The clutch member 5 is adapted to be shifted by a lever 4 pivoted on a bracket 4' rising from the bottom of the meter case.

Lever 4 is a stepped lever having a fork $4^a$ at one end adapted to straddle the clutch member 5 for shifting the latter as will be readily understood. A spring $4^b$ tends to shift clutch member 5 into coupled relation with member 5', said spring being connected to the forked end of the lever 4. When the flag or indicator 2 is up, the clutch members or elements 5 and 5' are disengaged to prevent the meter from recording. The mechanism for disengaging the clutch is a vertically disposed bar or slide 3 which is connected to the flag 2 in such a manner as to elevate the bar when the flag is lowered and vice versa. When the flag is up, the bar 3 is disposed alongside the adjacent end of the clutch lever 4 holding the same in such position that the clutch elements 5 and 5' will be uncoupled. The lower end of the bar 3 is inclined to a point away from the clutch lever 4 to permit the bar to wipe along the said adjacent end of the clutch lever to shift the same to clutch-open position against the tension of the spring $4^b$ as will now be readily understood. The above-described construction is well known in the art.

On shaft 8 is mounted a disk having a radial projection forming in effect a cam 9. Suitably supported within the meter case is a switch comprising in the present showing superposed yieldable elements 10 and 11 of which element 10 is disposed in the path of the cam 9. This switch may be termed a master switch and from it lead wires $10^a$ and 11ª in connection with other mechanism to be presently described.

In order to hold switch element 10 out of operative relation to the cam 9 at certain times, there is provided a horizontally disposed lever 12 pivoted intermediate its ends as at 13 to a suitable support. A spring 14 connected to said lever tends to swing the same in a clockwise direction as viewed in Figure 1. One arm of this lever underlies the lower end of the flag-controlled bar 3 whilst the other end 12' thereof overlies the upper switch element 11 of the master switch and under certain conditions presses down on the same sufficiently (because of the spring 14) to cause it to force the other switch element 10 out of operative relation to the cam 9, contact being established between said elements at such time. (See Fig. 6.)

When the flag 2 is in up position the bar 3 controlled thereby is at its downward limit of movement and presses on the arm of lever 12 therebelow to elevate the other arm 12' thereof away from the upper switch element 11 of the master switch, thus bringing the lower switch element into operative relation with the cam 9, the said elements, however, being in electrical contact with each other in the arrangement shown in Fig. 6. As the radial projection of the cam 9 wipes the switch element 10 the latter will be depressed and the electrical connection with switch element 11 broken. In other words in this arrangement of the master switch the switch is periodically opened as the cam rotates for a purpose that will presently appear. When the flag is down the bar 3 is up and consequently the master switch is not controlled by the cam 9 because the bar 3 does not press on the lever 12 allowing the spring 14 to act to depress the switch element 10, as will now be understood.

From the above description it will be seen that there is provided a switch mechanism the circuit of which is periodically broken under certain conditions depending on the position of the flag 2 and hence the bar 3. The application of this feature of the invention will now be explained.

In Fig. 2 is shown an ignition circuit containing a generator 15 adapted to supply current to a battery 17 through wires 16 and 26 when the dash board switch 19 is closed. In series with the generator-battery circuit is a switch 24 (or switches) controlled by a seat (or seats), this switch being normally closed in this particular circuit.

Between the generator and battery are primary and secondary coils 20 and 21, respectively, the secondary coil being in connection with a distributor 22 from whence lead wires to the spark plugs 23 of an explosive engine 18. When a passenger is sitting on the seats the circuit from the generator to the battery is broken by the opening of switch 24 and hence the primary and secondary coils will not function to transmit current to the spark plugs unless such current passes through the master switch within the meter. When the switch is of the character shown in Fig. 6 the current may pass through the switch provided the cam 9 has not displaced the switch element 10 out of contact with the other element 11 or in other words even though the flag 2 is up. However, if the flag is up a time will come when the switch will open due to the cam 9 and then the engine will stop.

Shunted across the generator-battery circuit wires 16 and 26 so as to cut out the seat switch 24 are wires 10ª and 11ª connected to the switch elements 10 and 11, respectively, of the master switch within the meter. If now the taxi driver has turned down the flag 2, as he should, when a passenger has entered the cab and seated himself, the said master switch will be kept closed in the manner already explained, and will not be disturbed by the cam 9. In other words, if the flag is not turned down at this time the cam 9 will periodically separate the switch element of the master switch within the meter and thus break the shunt circuit. It will therefore be seen that it is impossible for the driver to start the engine (depending on whether or not the switch happens to be in open or closed position through the action of said cam 9) but sooner or later the shunt circuit through the meter will be broken at the master switch by said cam 9 and hence the engine will stop. To insure a continuously closed circuit through the meter master switch it is obviously necessary for the driver to lower the flag 2.

When there is no passenger sitting on the seat the ignition circuit is independent of the meter switch and hence the vehicle can be operated with the flag up in which position the meter is not registering.

In Fig. 3 the arrangement is the same as in Fig. 2 except that a single seat switch is shown and a double pole switch 19' is provided in place of the switch 19.

In Fig. 4 I have shown the invention employed in connection with a magneto ignition circuit. In such circuit the engine is stopped by grounding the circuit through a dash board switch 19 (by closing the latter). A seat controlled switch 29 is adapted to be closed when a passenger sits on the seat. In series with the magneto and seat switch is the meter switch of the type shown in Fig. 7 which will be periodically closed by the cam 9 when the flag is up. To avoid periodic grounding the circuit through the seat switch and meter switch, the latter must be kept opened which is effected by lowering the flag. As shown in Fig. 7, the element 11' is arranged below the element 10' and is normally out of contact therewith as contradistinguished from a generator circuit where the said elements are normally in contact (see Fig. 6). When the flag is up the cam 9 will periodically depress the switch element 10' to contact with element 11' thus grounding the circuit through the seat. To avoid this the arm 12' of the switch controlling lever 12 is placed between the elements 10' and 11'. When the flag is lowered the switch element 11' is depressed sufficiently far away from the upper element 10' to avoid making contact with said element 10' as it is continually depressed by the cam 9 as will now be readily understood.

In Fig. 5 I have shown a magneto ignition circuit wherein the meter master switch may be of the type shown in Fig. 6 as in the generator-battery circuit, means being provided for automatically grounding the magneto when a passenger is seated on the seat unless the meter flag is down. In this circuit there is provided a switch 30 which will ground the magneto when drawn thereagainst by a spring 31. In order to hold the switch 30 open there is provided a solenoid magnet 32 energized by a battery 33. The circuit from the solenoid is completed by a normally closed switch 34 (may be omitted), wire 35 and a normally closed switch 36 controlled by a passenger's seat. When a passenger is on the seat the switch 36 will be opened, thus breaking the battery circuit, whereupon the switch 30, unless otherwise controlled, will contact with the magneto and ground the same, resulting in the stopping of the engine. Inasmuch as the meter switch in this circuit is of the same type (Fig. 6) as in the generator-battery circuit current from the solenoid battery 33 may pass through the switch even though the meter flag is up subject to be broken sooner or later as the cam 9 rotates. While current passes through the meter switch to ground, the solenoid is, of course, energized, thus preventing the magneto from being grounded or short circuited. To avoid periodic opening of the meter switch it is of course necessary for the driver to lower the flag which will dispose the switch out of interference with the cam as will now be readily understood.

While for convenience of illustration I have shown the cam 9 arranged on the shaft 8 it may obviously be arranged on the shaft 6 and appropriate changes made in the switch mechanism.

As a subcombination of the invention may be mentioned the fact that by omitting the seat circuits leaving the other circuits intact, the ignition circuit will be periodically deranged through operation of the meter cam or the master switch therein when the flag is up. This, however, will prevent the vehicle from being operated for any distance, as may be necessary in moving from point to point with a passenger. To overcome this disadvantage there may be provided means operable independent of the flag-operated bar 3 for holding the master switch from interference by the cam.

Having thus described my invention, I claim:—

1. In a passenger vehicle, the combination of a taximeter driven by said vehicle, an indicator for indicating the presence of a passenger in the vehicle and simultaneously starting the registering device within the meter, a switch associated with the meter in circuit with means removed from the meter interfering with the free operation of the vehicle when the indicator is not in position for indicating the presence of a passenger, means operated by mechanism associated with the meter for interfering with the normal circuit of said switch when the indicator is not properly set for indicating the presence of a passenger in the vehicle, and means controlled by said indicator when properly set for rendering the switch-interfering means ineffective.

2. In a passenger vehicle, the combination of a taximeter driven by said vehicle, an indicator for indicating the presence of a passenger in the vehicle and simultaneously starting the registering device within the meter, a switch associated with the meter in circuit with means removed from the meter interfering with the free operation of the vehicle when the indicator is not in position for indicating the presence of a passenger, a cam operated by the meter interfering with the normal circuit of the switch when the indicator is not properly set for indicating the presence of a passenger in the vehicle, and means controlled by said indicator for rendering the action of the cam on the switch non-effective when the indicator is properly set.

3. In a passenger vehicle, the combination of a taximeter driven by said vehicle, an indicator for indicating the presence of a passenger in the vehicle and simultaneously starting the registering device within the meter, a switch associated with the meter in circuit with means removed from the meter interfering with the free operation of the vehicle when the indicator is not in position for indicating the presence of a passenger, a cam operated by the meter interfering with the normal circuit of the switch when the indicator is not properly set for indicating the presence of a passenger in the vehicle, said switch including a yieldable element which is adapted to be wiped by the cam, and means controlled by said indicator for rendering the action of the cam on the wiped switch element of no effect when the indicator is properly set.

4. In a passenger vehicle, the combination of a taximeter driven by said vehicle, an indicator for indicating the presence of a passenger in the vehicle and simultaneously starting the registering device within the meter, a switch associated with the meter in circuit with means removed from the meter interfering with the free operation of the vehicle when the indicator is not in position for indicating the presence of a passenger, a shiftable bar controlled by said indicator, a cam operated by the meter mechanism for periodically interfering with the normal circuit of said switch when the indicator is not properly set for indicating the presence of a passenger within the vehicle, and means operated on by said bar for rendering the action of the cam on the switch ineffective when the indicator is properly positioned.

5. In a passenger vehicle, the combination of a taximeter driven by said vehicle, an indicator for indicating the presence of a passenger in the vehicle and simultaneously starting the registering device within the meter, a switch associated with the meter in circuit with means removed from the meter interfering with the free operation of the vehicle when the indicator is not in position for indicating the presence of a passenger, means operated by mechanism associated with the meter for interfering with the normal circuit of said switch when the indicator is not properly set for indicating the presence of a passenger in the vehicle, and means in circuit with the said switch for rendering the switch-interfering means of no consequence as regards the free operation of the vehicle, when the meter indicator is up, to permit free movement of the vehicle when the vehicle contains no passenger.

6. In a passenger vehicle, the combination of a taximeter driven by said vehicle, an indicator for indicating the presence of a passenger in the vehicle and simultaneously starting the registering device within the meter, a switch associated with the meter in circuit with the ignition circuit, means operated by mechanism associated with the meter for periodically interfering with the normal circuit of said switch when the indicator is not properly set for indicating the presence of a passenger in the vehicle, means controlled by said indicator when properly set for rendering the switch-interfering means ineffective, and means in circuit with said switch and controlled by the passenger for interfering with the free operation of the vehicle unless the meter indicator is properly set for indicating the presence of a passenger.

7. In a passenger vehicle, the combination of a taximeter driven by said vehicle, an indicator for indicating the presence of a passenger in the vehicle and simultaneously starting the registering device within the meter, a switch associated with the meter in circuit with the ignition circuit, means operated by mechanism associated with the meter for periodically interfering with the normal circuit of said switch when the indicator is not properly set for indicating the presence of a passenger in the vehicle, means controlled by said indicator when properly set for rendering the switch-interfering means ineffective, and a circuit from the switch leading to a passenger's seat in the vehicle, said seat circuit adapted to render the switch-interfering means in the meter of no effect when the indicator is up in the absence of a passenger on the seat.

8. In combination with a motor vehicle having an engine and a seat, a meter for recording mileage, an electric circuit for operating the engine, a switch in said circuit adapted to be opened when a passenger sits on the seat, and a second switch in parallel with the first switch adapted to be held closed by the meter mechanism while the meter is recording and periodically opened when the meter is not recording.

In testimony whereof I affix my signature.

LOUIS ALTER.